May 21, 1957 J. S. DESKUR 2,792,949
APPARATUS FOR STRINGING TOBACCO LEAVES AND THE LIKE
Filed March 8, 1956 3 Sheets-Sheet 1
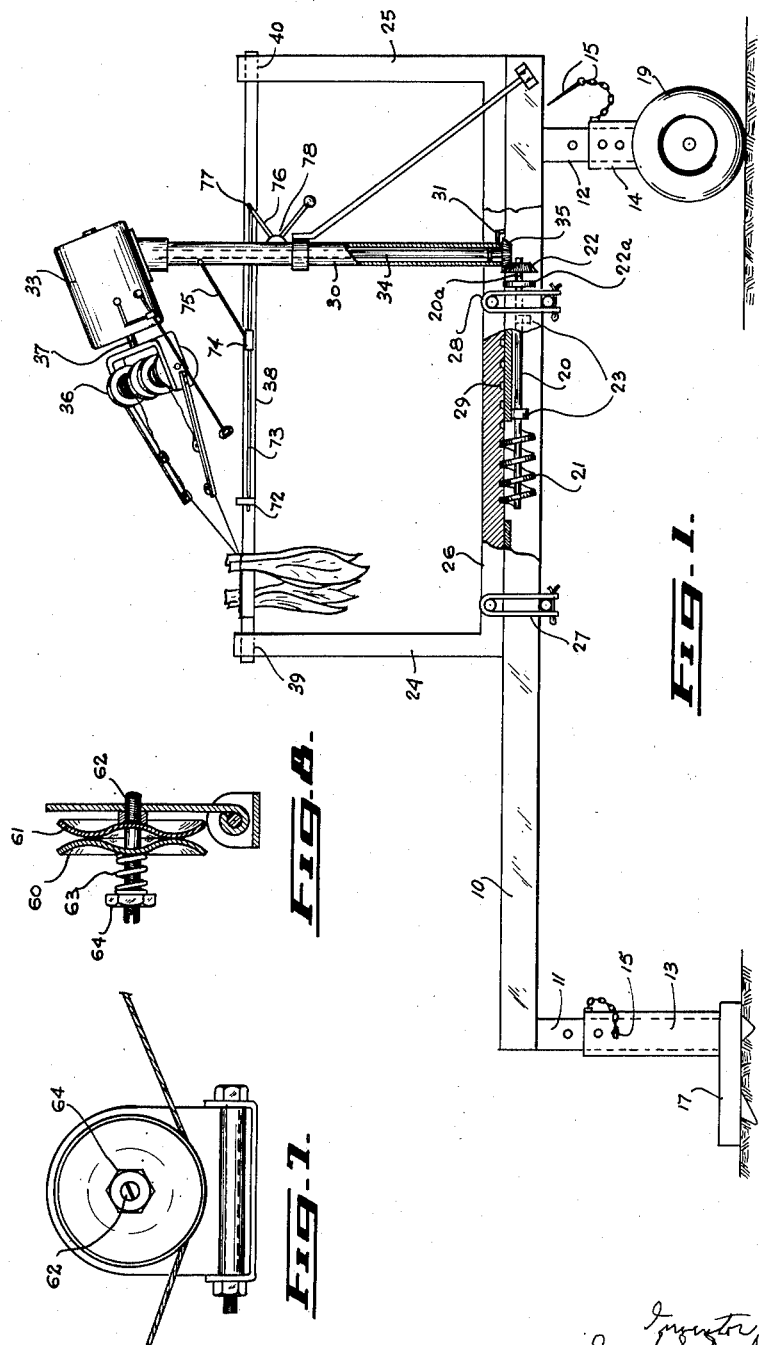

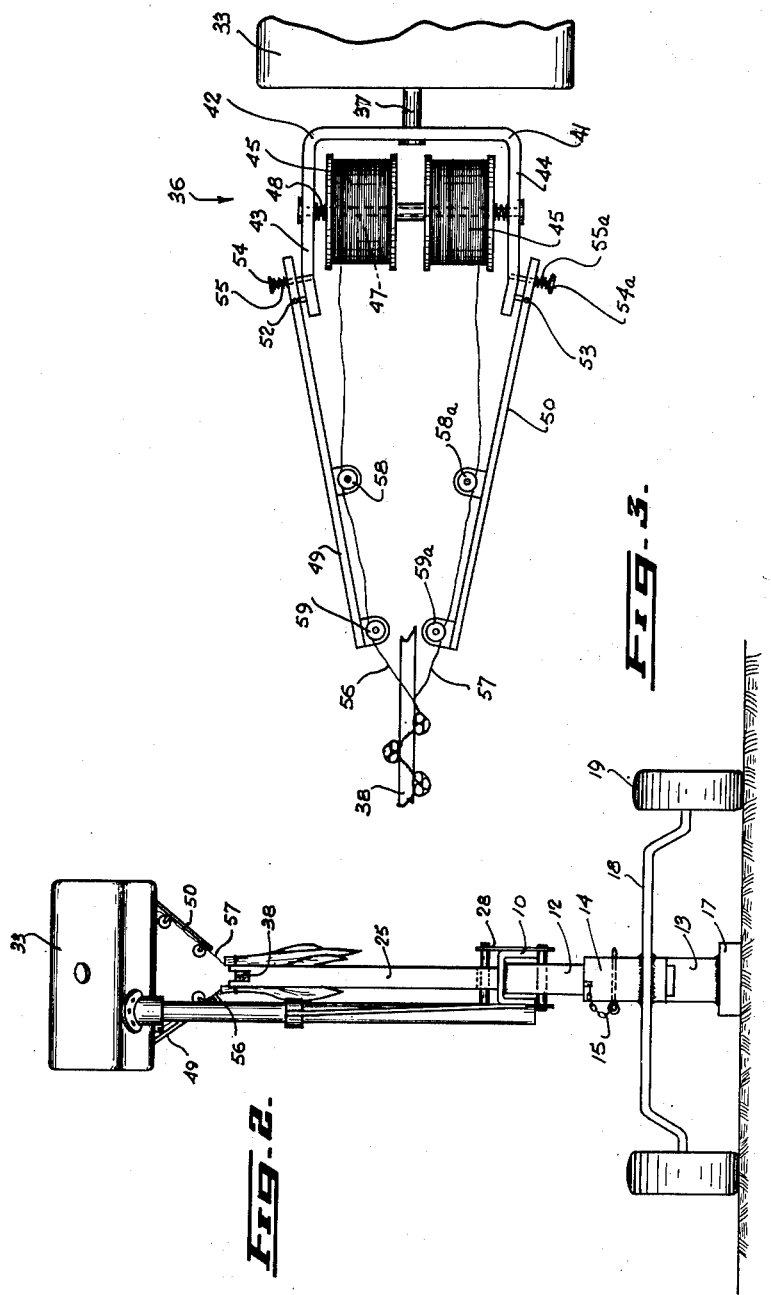

May 21, 1957 J. S. DESKUR 2,792,949
APPARATUS FOR STRINGING TOBACCO LEAVES AND THE LIKE
Filed March 8, 1956 3 Sheets-Sheet 3
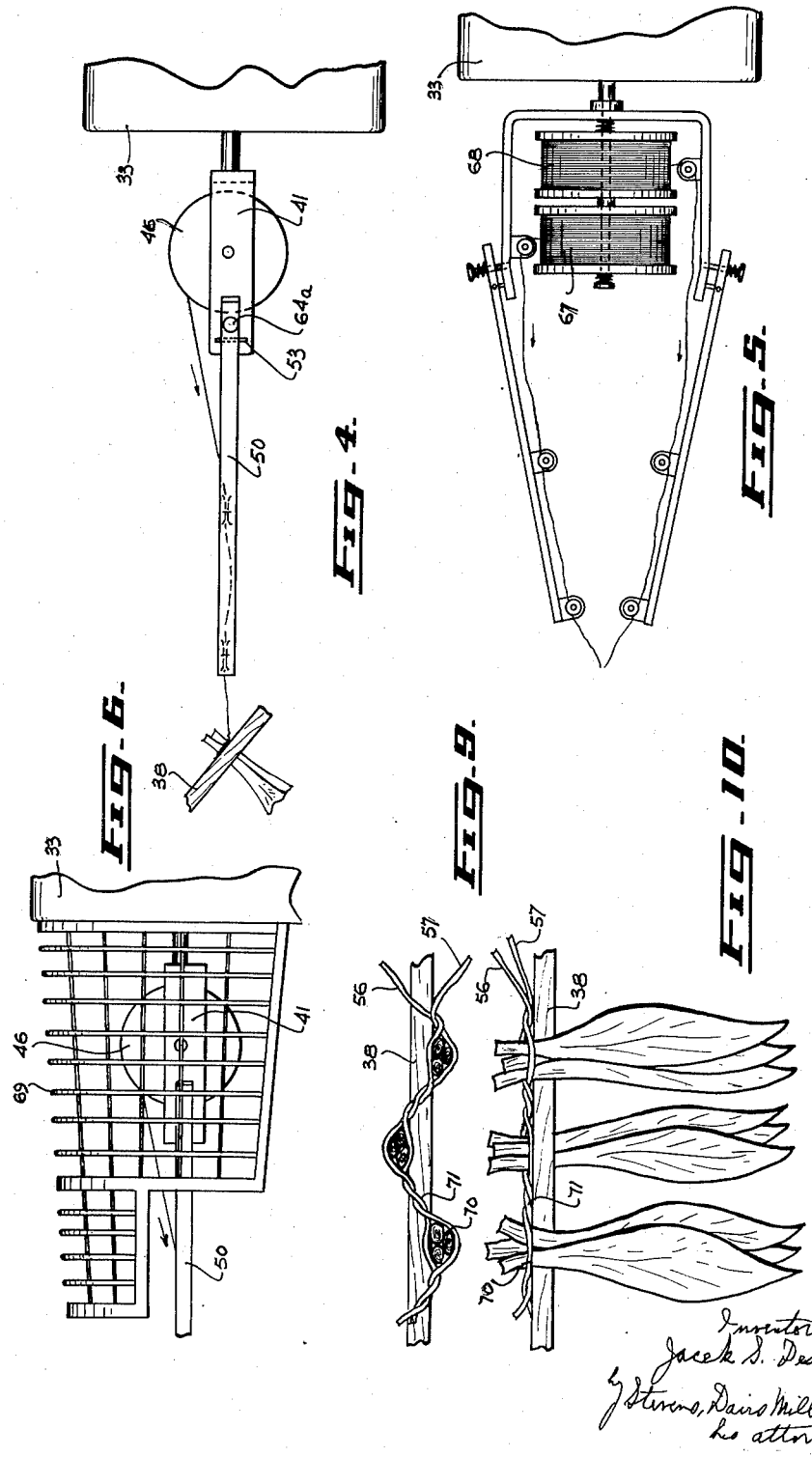

United States Patent Office 2,792,949
Patented May 21, 1957

2,792,949

APPARATUS FOR STRINGING TOBACCO LEAVES AND THE LIKE

Jacek S. Deskur, Delhi, Ontario, Canada

Application March 8, 1956, Serial No. 570,333

Claims priority, application Canada March 11, 1955

3 Claims. (Cl. 214—5.5)

This invention relates to an apparatus for stringing tobacco leaves or the like on sticks.

In the course of preparing tobacco for the market, the green tobacco brought from the field is strung on sticks and cured. The conventional method for stringing the tobacco leaves involves three operators, one operator is positioned on each side of the stick to assemble the leaves as bunches and to place successive bunches in position on his side of the stick. A third operator wraps a string first around the bunch at one side of the stick and then around a bunch on the other side of the stick and continues in this manner until a sufficient number of bunches have been strung on the stick. It will be appreciated that the foregoing procedure is slow and cumbersome and has the disadvantage of requiring three operators.

A number of machines have been proposed but none of these have been satisfactory as they have in general been unduly costly or have not operated effectively. Some of the machines have been based on passing stitches through the stems of the leaves and have been extremely complex and costly in addition to which the necessary apertures through the stems have tended to weaken the stems. Others of the machines have involved passing loops around the stems but have been unduly costly or have not acted effectively to fasten the leaves securely to the stick or have not resulted in the elimination of one of the operators.

The object of this invention in accordance with one aspect thereof is to provide an apparatus which is of simple construction and which is adapted to string tobacco leaves or the like to a stick so that the leaves will be securely attached thereto but can readily be stripped from the stick when desired.

A further object of this invention is to provide an apparatus as in the preceding paragraph adapted to be operated by only two operators.

While this invention is primarily for stringing tobacco leaves it will be appreciated that it could also be used for other similar purposes involving the attachment of leaves, plants or other objects to a stick.

In the drawings which illustrate the preferred embodiment of this invention:

Figure 1 is a side elevation view of an apparatus in accordance with this invention.

Figure 2 is an end elevation view of the apparatus shown in Figure 1.

Figure 3 is a detailed side elevation view of part of the apparatus shown in Figure 1.

Figure 4 is a drawing similar to Figure 3 but showing the apparatus at a different position of rotation.

Figure 5 is a drawing similar to Figure 3 but showing an alternative embodiment of the invention.

Figure 6 is a drawing similar to Figure 4 but showing the apparatus modified to include a safety shield.

Figure 7 is a detailed plan view of a tensioning pulley used in the embodiments shown in Figures 1 to 6.

Figure 8 is an elevation view of the pulley shown in Figure 7.

Figure 9 is a plan view showing a stick upon which leaves have been strung in accordance with this invention.

Figure 10 is an elevation view corresponding to Figure 9.

Referring now to Figures 1 to 4 inclusive the apparatus illustrated includes a stationary channel member which is suitably mounted by feet 11 and 12 which depend downwardly from channel 10 and are received by socket members 13 and 14 respectively. The socket members are fitted with catches 15 and 16 respectively to retain feet 11 and 12. Socket member 13 is shown mounted on a platform 17 and socket member 14 is shown mounted on a transverse member 18 which is provided with wheels 19. With the foregoing arrangement the apparatus can readily be transported by disengaging catch 15 and using wheels 19. When, however, catch 15 is engaged the equipment is firmly retained in position by platform 17. Any other suitable mounting means such as a pair of platforms or two pairs of wheels may be used.

Channel 10 contains a shaft 20 upon which is mounted a worm gear 21. A bevel gear 22 is mounted on a laterally offset stub shaft 20a driven by intermeshing spur gears 22a on shaft 20 and stub shaft 20a. Shaft 20 is journalled in bearings 23. A framework comprising upright members 24 and 25 and a horizontal member 26 connected to the lower ends of upright members 24 and 25 is slidably mounted on channel 10 by guides 27 and 28. The lower surface of member 26 is provided with teeth 29 to mesh with worm gear 21 so that rotation of shaft 20 causes the frame work to travel along channel 10.

A sleeve 30 is joined to channel 10 at 31 and is further supported by a brace 32 which is connected between sleeve 30 and channel 10. Sleeve 30 provides a support for a suitable motor 33 such as an electric motor having two power outputs. Shaft 34 is one of the power outputs of motor 33 and is disposed within sleeve 30. A bevel gear 35 at the lower end of shaft 34 meshes with bevel gear 22. A tying head designated generally as 36 and shown in detail in Figures 3 and 4 is driven by the second power output 37 of motor 33.

The stick 38 upon which the tobacco leaves or the like are to be strung is secured between the upper ends of frame members 24 and 25. Stick 38 is shown retained within sockets 39 and 40 by the resilience of members 24 and 25 but other releasable securing means can be used.

The tying head 36 is mounted on output shaft 37 and comprises a channel shaped member 41 having a base portion 42 and side pieces 43 and 44. A pair of reels 45 are mounted on shaft 47 which in turn is mounted between side pieces 43 and 44. Springs 48 are mounted on shaft 47 and provide a convenient means of clamping the rotation of the reels. Guide arms 49 and 50 are pivotally mounted at 52 and 53 respectively on side pieces 43 and 44 respectively. A pin 54 passes through guide arm 49 and is attached to side piece 43 and a compression spring 55 mounted on pin 54 bears on guide arm 49 to retain guide arm 49 normally face to face with side piece 43 while permitting the leading end of guide arm 49 resiliently to pivot inwardly. Pin 54a and spring 55a act similarly to control guide arm 50. The resilience thus provided for the guide arms has the important practical advantage of absorbing without breakage strains on the tying filament caused by starting the motor or which may incidentally arise during the operation of the apparatus.

The tying filaments 56 and 57 pass from reels 45 and 46 respectively over pulleys 58 and 58a and tensioning pulleys 59 and 59a. Each of these pulleys are mounted on guide arms 49 or 50. The structure of tensioning pulleys 59 and 59a is shown in Figures 7 and 8. These tensioning pulleys each comprise a pair of discs 60 and 61 outwardly directed at their peripheries to define a V-shaped notch to receive the filament and mounted on pin 62. A compression spring 63 is retained on pin 62 by adjustment nut 64 and acts to urge discs 60 and 61 together. Accordingly the drag on the filament exerted by the tensioning pulley can be adjusted by changing the position of nut 64.

Control levers 66 and 65a extend from motor 33 to positions adjacent to the leading ends of guide arms 49 and 50 as shown in Figures 1 and 2. The control levers are adapted to simultaneously control both power outputs of the motor preferably by means of a conventional clutch mechanism (not shown) but alternatively by means of a switch for energizing and deenergizing the motor. If desired one of the control levers can also be linked by link 66 to a reverse lever 65 for reversing the rotation of power output shaft 37 only. This will cause actuation of one of the control levers to rotate the tying head in one direction and actuation of the other control lever to rotate the tying head in an opposite direction. If the tying head is to be rotated in the same direction throughout link 66 can be disconnected.

The tying thread 56 has been referred to as a filament as it can be string or any other suitable filament. The term filament is also contemplated as including a pair of filaments whether mounted on the same or separate reels which are controlled similarly to the single filaments shown in the drawings. In Figure 1 to 4 inclusive the reels have been shown mounted with their axes parallel to base portion 42, however, as shown in Figure 5, reels 67 and 68 could also be mounted on a shaft which extends in the same direction as shaft 37.

If desired a suitable protective cage 69 can be used as illustrated in Figure 6 to protect the operators.

It will be perceived that the apparatus which has been described provides a highly convenient and effective means for attaching articles such as bunches of tobacco leaves 70 to stick 38. Filaments 56 and 57 are tied to stick 38 adjacent to member 39. The spaced ends of the guide arms maintain the filaments in the form of a V. One of the operators then assembles a bunch of tobacco leaves and with one hand places the bunch so that the stems are fitted into the V between the filaments and then with the same hand actuates lever 66 to revolve the tying head preferably several times. This causes the filaments to be twisted together, as shown at 71 in Figure 9, firmly retaining the stem. At the same time stick 38 has automatically been moved a short distance equal to the spacing between the bunches of leaves. The operator then allows the leaves to fall to his near side of the stick further tightening the grip of the filaments on the stem. The second operator then follows a similar procedure using his operating lever to rotate the tying head in the same direction as before or in an opposite direction. In the meanwhile the first operator is assembling another bunch of leaves. This continues until a sufficient number of bunches have been attached to the stick when the filaments are broken and tied to the stick and the operation repeated with a new stick.

The relative movement between the stick and the tying head is an important aspect of this invention as in the first place the ends of the guide arms can be positioned in exactly the most favourable position with respect to the bunch being tied and will remain in substantially the same relative position with respect to successive bunches. Furthermore this makes it possible to place the control lever in a position in which it is readily accessible to each operator as he inserts his bunch. If the motor and tying head were stationary at one end of the stick it would be difficult to provide control levers which were available to the operators at all times and also the filaments could not be properly located for correct tying and spread to form a wide V. A further advantage of the relative movement is that it assists in giving an evenly loaded stick in which the bunches are equally spaced. Preferably the stick moves and the motor is stationary as this enables the operators to remain stationary instead of having to move along the stick.

Another feature of this invention is that the tying head can be given several turns between each insertion of a bunch of leaves. The consequence, as is apparent from Figure 9 is that the portions of the filaments which are on each side of the stems and which pass over the stick are tightly twisted together to hold the stems securely. A single twist would not be fully effective with many types of string. Preferably at least three turns are used.

The tightly twisted filaments thus provided securely retain the stems in spite of the shrinkage of the stems which occurs during drying. The use of a single twist with unsuitable string would give rise to the possibility of premature stripping during drying due to the free space around the stems resulting from this shrinkage.

If the tying head is, as is preferred, rotated alternately in one direction and then in the other direction the stems can readily be stripped by withdrawing one bunch the filaments retaining the remaining bunches will then automatically become loosened in sequence allowing the bunches to fall free of the stick. If the tying head is rotated throughout in the same direction the removal of a few bunches will loosen the filaments sufficiently for the remaining bunches to be extracted without difficulty.

If desired, a pusher member can be used to assist the operators correctly to position the leaves being tied. The pusher member is shown only in Figure 1 and comprises a pushing head 72 mounted at the end of rod 73. Rod 73 slides in a guide sleeve 74 which is mounted by supporting member 75 on sleeve 30. A crank lever 76 is pivotally connected at 77 to rod 73 and is pivotally mounted on boss 78. The actuation of the crank lever by one of the operators causes head 72 to move forwardly and first downwardly and then upwardly into the V formed between the filaments to press the stems tightly into position.

I claim:

1. An apparatus for stringing the stems of tobacco leaves or the like on a stick comprising a tying head having a pair of guide arms one end of each of said guide arms being spaced from the corresponding end of the other of said guide arms, guide means at said one end of each of the guide arms, means for supplying a filament to each of said guide means, said guide means being adapted to be located at a position above and adjacent to the portion of the stick to which the stems are being tied to spread said filaments into a V, the open portion of said V extending in the direction of the axis of rotation of the tying head, means for rotating said tying head to twist said filaments together and means operably connected to said means for rotating said tying head for moving said stick relatively to the tying head in a direction away from the tying head to advance the bare portion of the stick towards the tying head at a rate such that a constant angle of said V is maintained.

2. An apparatus as in claim 1 in which each of said guide arms extend in the direction of the portion of the stick to which the stems are being tied and diverge inwardly at an angle less than the apex angle of said V are resiliently movable radially inwardly with respect to the axis of rotation of the guide arms to absorb strains on said filaments.

3. An apparatus as in claim 1 in which said V extends angularly to said stick for convenient insertion of said stems.

References Cited in the file of this patent
UNITED STATES PATENTS

| | | |
|---|---|---|
| 2,538,698 | McNeill | Jan. 16, 1951 |
| 2,571,003 | Anderson | Oct. 9, 1951 |
| 2,649,977 | Palmer | Aug. 25, 1953 |
| 2,722,321 | Touton | Nov. 1, 1955 |